United States Patent Office 3,281,652
Patented Oct. 25, 1966

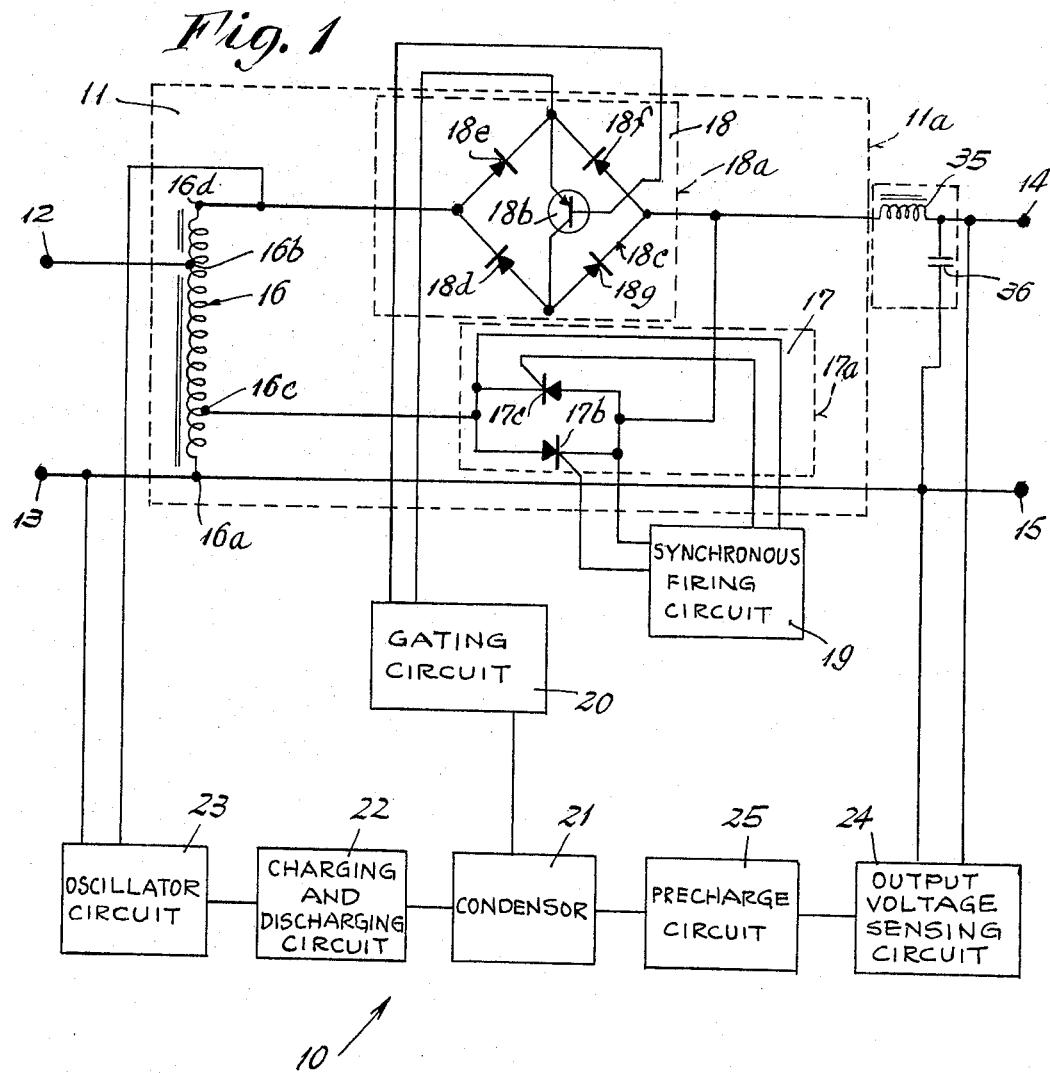

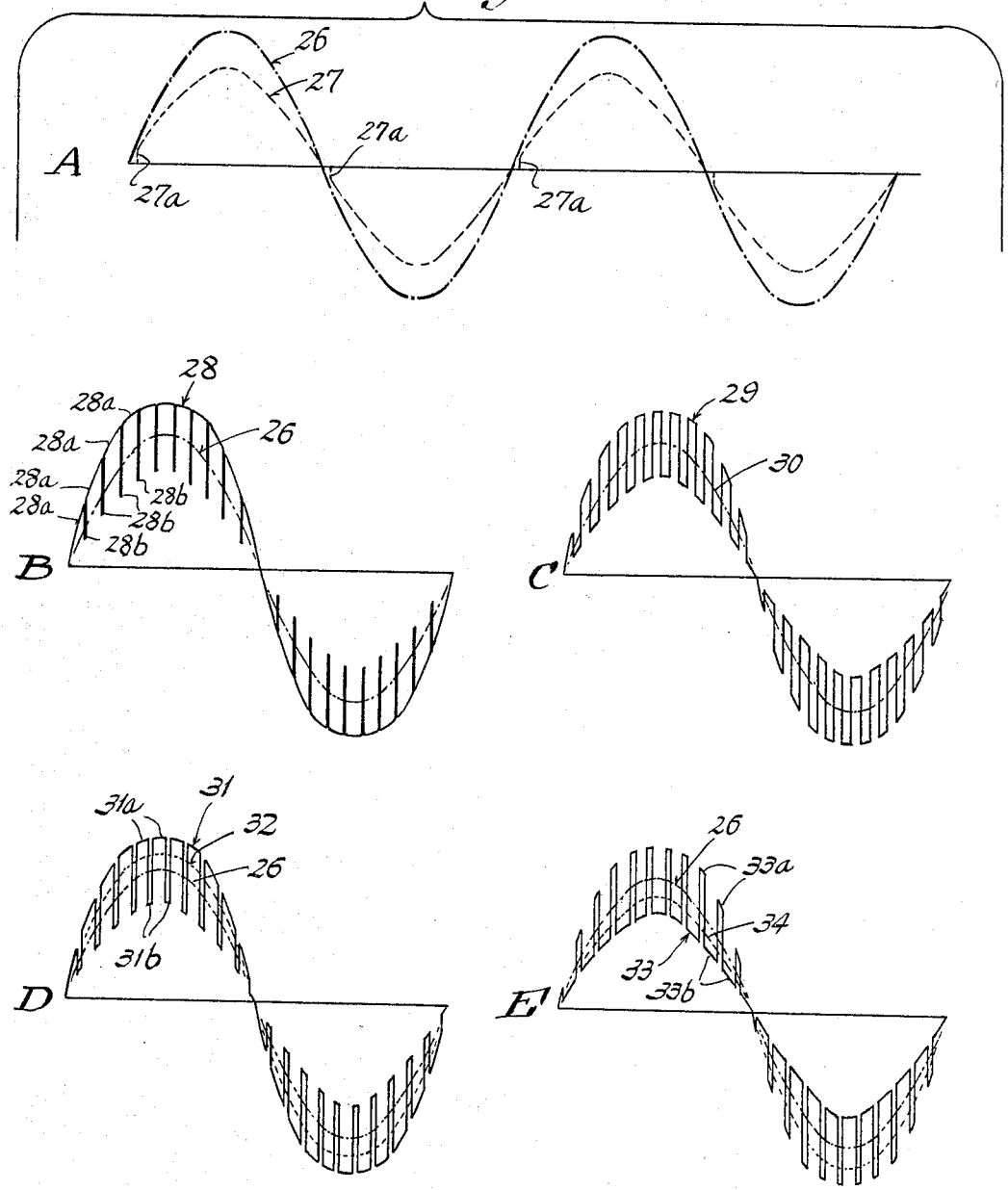

3,281,652
POWER REGULATING CIRCUIT
Allen R. Perrins, Cheshire, Conn., assignor to The Superior Electric Company, Bristol, Conn., a corporation of Connecticut
Filed July 24, 1962, Ser. No. 212,015
9 Claims. (Cl. 323—19)

The present invention relates to a power regulating circuit which may be employed in an automatic voltage regulator to regulate and maintain substantially constant an output voltage even with variations in the input voltage and power controlled by the power regulating circuit.

In my copending application, Serial No. 208,270, filed July 9, 1962, there is disclosed a power regulating circuit for an automatic voltage regulator which includes an increased voltage circuit and a decreased voltage circuit. The circuits are connected between input and output terminals to control the voltage at the output terminals and while the circuits are normally nonconductive between the terminals, they are energizable to be conductive. In the invention disclosed in said application, only one of the circuits is capable of being conductive at a time and the output voltage is maintained at the desired value by shifting the conduction between the input and output terminals from one circuit to another. However, when the power regulating circuit is employed to regulate alternating current voltage, there is only one shifting of conduction for each half cycle of alternating current input from one circuit to the other. While such a power circuit has been found satisfactory in many applications, in others it has been found not to be completely satisfactory by reason of the distortion produced in the output wave because of the shifting of conduction. The distortion is mostly harmonics that are multiples of the 60 cycle frequency or of the input frequency because the shifting is at twice the input frequency and hence it has been found difficult to eliminate the distortion by the use of well-known filters as they would also tend to filter the input frequency and hence render the power circuit quite inefficient.

It is accordingly an object of the present invention to provide a power circuit which may be employed in an automatic voltage regulator having an increased and decreased voltage circuit in which the distortion in the output voltage is substantially minimized.

A further object of the present invention is to provide in a power circuit in the above type when employed to regulate A.C. voltage for substantially all of the distortion that is produced, to have a frequency which is readily susceptible to filtering and is substantially different than the input frequency of the voltage.

Another object of the present invention is to provide such a power circuit which is reliable in use, capable of functioning over a wide range of input and output voltages and which employs a minimum of parts.

In carrying out the present invention, the power circuit has a pair of input terminals which are connectible, in the specific embodiment hereinafter disclosed, to a source of alternating current, as for example the usual 60 cycle alternating current voltage though, as will readily be appreciated, D.C. voltage may also be controlled, and a pair of output terminals. The power circuit includes an increased voltage circuit and a decreased voltage circuit that are connected between the input and output terminals. The decreased voltage circuit is normally non-conductive but when energized is rendered conductive to produce a lower voltage at the output terminals than the increased voltage circuit which also is only conductive when energized. Moreover, only one voltage circuit is capable of being conductive at a time. For each half cycle of alternating current input, the present invention provides for shifting the conduction from one voltage circuit to the other many times during the half cycle with the total duration of conduction for each circuit for each half cycle being dependent upon the output voltage that is desired to be maintained and its relation to the input voltage. Moreover, for maximum output voltage, only the increased voltage circuit conducts while for minimum output voltage only the decreased voltage circuit is rendered conductive.

More specifically in the herein disclosed embodiment of the invention, the decreased voltage circuit consists of a pair of semiconductor elements each being a silicon controlled rectifier, herein called an SCR element, connected oppositely in parallel and to one of which is applied a firing signal that energizes or triggers one SCR into a state of conduction at substantially the beginning of each alternate half cycle maintaining it conductive for the duration of the half cycle while the other SCR is energized into a state of conduction for each of the other alternate half cycles at substantially the beginning thereof and maintained conductive for the duration of the half cycle. Thus the decreased voltage circuit is energized to be conductive throughout substantially each complete cycle of A.C. input voltage. The increased voltage circuit, according to the present invention, is essentially a switch means that is either conductive or nonconductive and herein consists of a power transistor which is energized to be conductive at selected times of each half cycle when the output voltage is to have a larger value than the value which the decreased voltage circuit can provide. However, according to the present invention, the frequency of shifting between conduction and nonconduction for the increased voltage circuit for each half cycle is many times the input voltage frequency and thus during each half cycle for output voltages greater than the minimum, conduction is continually shifted between the increased voltage circuit and the decreased voltage circuit. Thus, the total duration of time that each circuit conducts for each half cycle is accordingly determinative of the resultant output voltage value. The frequency at which the conduction is shifted between the two circuits with consequent introduction of distortion in the output voltage is preferably selected such that well-known filters may be employed to filter the distortion with little power loss in the frequency of the input voltage.

Other features and advantages will hereinafter appear.
In the drawing:
FIGURE 1 is a schematic diagram of the power circuit of the present invention shown incorporated in an automatic voltage regulator having adjunct circuits shown in block form.

FIG. 2, A through E, consists of groups of output voltage waves which may appear under certain conditions of operation of the power regulating circuit of the present invention.

Referring to the drawing, an automatic voltage regulator is generally indicated by the reference numeral 10 and the power circuit of the present invention is generally indicated by the reference numeral 11 and enclosed within dotted lines 11a. The regulator has a pair of input terminals 12 and 13 that, as herein described, are connectible to a source of A.C. voltage, and a pair of output terminals 14 and 15 across which the output voltage appears. Input terminals 12 and 13 are connected to an autotransformer 16 with the terminal 13 being connected to an end 16a and the input terminal 12 to an intermediate tap 16b on the transformer winding. Further provided on the autotransformer 16 is a decreased voltage tap 16c while its other end is denoted by reference character 16d. The power circuit 11, according to the present invention, includes a decreased voltage circuit 17 enclosed within the dotted lines 17a and an increased voltage circuit 18 enclosed within the dotted lines 18a. The decreased voltage circuit is connected between the output terminal 14 and to the tap 16c while the increased voltage circuit is connected between the output terminal 14 and the other end 16d.

It will be appreciated that the value of voltage between the end 16a and the tap 16c is less than the value of voltage between the ends 16a and 16d and that these two voltage values appear substantially between the output terminals 14 and 15. While connections have been shown to an autotransformer 16 and the output terminals of the regulators 14 and 15, it will be appreciated that the increased and decreased voltage circuits may be connected to a buck-boost transformer of a regulator as is well known in the art of regulators.

The decreased voltage circuit 17 is normally non-conductive but is energizable to be conductive and according to the present invention includes two semiconductor elements 17b and 17c which are particularly silicon controlled rectifiers (SCR) that block current flow in the cathode to anode direction and also in the anode to cathode direction unless a trigger signal is applied between the cathode and gate to render it conductive in the anode to cathode direction. The two elements are connected oppositely in parallel between the tap 16c and the output terminal 14. An energizing or trigger signal is applied between the gate and cathode of SCR 17b for each half cycle of alternating current input when the tap 16c is positive to render it conductive to current flow between the tap 16c and the terminal 14 while a trigger signal is applied between the gate and cathode of SCR 17c for the other alternate half cycles of alternating current when the terminal 16c is negative to render it conductive to current flow between the terminal 14 and the tap 16c. Moreover, by reason of the SCR elements being normally blocking in the cathode to anode direction, no current will flow reversely through one SCR for the half cycles when the other is conducting. For providing the trigger signals to the SCR's 17b and 17c there is shown in block diagram a synchronous firing circuit 19 of the type which applies the trigger signal to the SCR's 17b and 17c for their respective half cycles of input voltage and maintains the signal through the half cycle.

The increased voltage circuit 18 includes a power transistor 18b of the PNP type and having its emitter and collector connected across opposite terminals of a full-wave rectifying bridge 18c having diodes 18d, 18e, 18f and 18g. One of the other two opposite terminals of the bridge 18c is connected to the end 16d of the autotransformer 16 and the other opposite terminal to the output terminal 14.

It will be appreciated that current flow through the increased voltage circuit between the output terminal 14 and the autotransformer 16 for each half cycle of the input voltage when the end 16d is positive is through the diode 18e, the emitter-collector of the transistor 18b and diode 18g to the output terminal 14 while for current flow when the end 16d is negative, conduction is effected through the diode 18f, emitter-collector of transistor 18b and diode 18d. Current flow however through the increased voltage circuit can only occur when the transistor 18b is rendered conductive in its emitter-collector path. The base-emitter of the transistor 18b is connected to a gating circuit 20 which supplies the signal for rendering the emitter-collector of the transistor 18b conductive. The gating circuit in turn is connected to a condenser 21 which is charged and discharged by a charging and discharging circuit 22 in synchronism with and at a frequency determined by an oscillator circuit 23 which is connected to the input terminal 13 and end 16d. The charging and discharging circuit 22 normally is insufficient to produce on the condenser 21 a voltage charge which renders the trigger circuit 20 to a state that produces a gating signal to the emitter-base of transistor 18b as this circuit 22 charges the condenser 21 at a linear charging rate which is insufficient during each half cycle of the frequency of the oscillating circuit to reach such a value of voltage charge for rendering the circuit 20 to produce the gating signal. Moreover, this circuit 22 discharges the condenser at every half cycle of the oscillating circiut frequency. As the power circuit is herein shown in an automatic voltage regulator there is provided an output voltage sensing circuit 24 that senses the output voltage and supplies a signal to a precharge circuit 25. The precharge circuit 25 applies to the condenser 21 for each half cycle of the oscillator circuit frequency, a value of precharge voltage that depends upon the value of the output voltage and its relation to the voltage desired to be maintained. Thus by properly precharging the condenser 21 and then by linearly charging it, the gating circuit renders the emitter-collector circuit of transistor 18b conductive at a time in each half cycle of the oscillator circuit frequency that depends upon the value of the precharge of the condenser. Moreover, if there is insufficient precharge there is no gating signal and additionally the transistor 18b is rendered nonconducting at substantially the beginning of each half cycle of the oscillator circuit frequency.

The synchronous firing circuit 19, gating circuit 20, condenser 21, charging and discharging circuit 22, precharge circuit 25 and output voltage sensing circuit 24 are schematically shown and their operation described in my above-mentioned copending application and though in said application the charging occurs at the frequency of the input voltage, herein the oscillator circuit 23 which may be of any conventional construction causes the other circuits 22, 21, 25, 24 and 20 to shift the conduction between the two voltage circuits at the fresuency of the oscillator circuit 23 rather than at the frequency of the input voltage frequency.

In the operation of the power circuit of the present invention for the half cycle of the input voltage when the tap 16b is positive which renders the tap 16c and end 16d positive, the SCR 17b is rendered conducting and current flows from the tap 16c through SCR 17b to the terminal 14. Upon a gating signal being applied to the base-emitter of transistor 18b, current is conducted through the diode 18e, the emitter-collector of the transistor 18b and diode 18g to the output terminal 14. Upon conduction through the transistor 18b, it will be appreciated that the SCR 17b becomes reversely biased by the voltage between the end 16d and the voltage 16c which renders the SCR 17b nonconducting and thus prevents conduction of current through the decreased voltage circuit. Moreover, by the SCR 17c having no trigger signal applied thereto, there is no conduction therethrough caused by this voltage between the two voltage circuits.

For the other half of the cycle of the input voltage when the end and tap, 16b and 16c respectively, are negative the SCR 17c is rendered conductive and maintained conductive until a gating signal is applied to the transistor 18b when current will accordingly flow through the diode 18f, the transistor 18b and diode 18d. As in the other half cycle when the increased voltage circuit becomes conductive, it back-biases the conducting SCR in the decreased voltage circuit, ceasing conduction through the decreased voltage circuit and also prevents the voltage appearing between the tap 16c and 16d from causing current flow in the other direction through the decreased voltage circuit.

It will be understood that while an SCR device once triggered into conduction inherently remains conductive, while current above a small minimum flows therethrough but in the power circuit of the present invention as current conduction is intermittent, the synchronous firing circuit continually supplies a trigger signal to the proper SCR and thus maintains it ready for conduction when current conduction through the increased voltage circuit stops.

Referring to FIG. 2, there are shown voltage waves which exist under different conditions of operation of the power circuit. Wave group A includes a wave 26 of the input voltage and an output voltage wave 27 that exists for the condition when it is desired to have at the output terminals 14 and 15, the voltage produced only when the decreased voltage circuit 17 is conductive. This is the voltage between the end 16a and the tap 16c. The voltage wave 27 is substantially identical to the input voltage wave 26 though slightly lower in value because of the difference between the end 16a and the tap 16c and 16b. However, by reason of the synchronous firing circuit producing a trigger signal for the SCR only shortly after the beginning of each half cycle when the instantaneous voltage has reached a minimum low value there is caused an initial nonconductive start 27a. This occurs irrespective of whether SCR 17b or 17c is conducting. The upper half cycles of the wave 27 occur when the SCR 17b is rendered conducting while the lower half cycles occur when the SCR 17c is conducting.

For the condition that exists when it is desired to have the voltage across the terminals 14 and 15 be that determined by the increased voltage circuit, the waves in wave group B appear. This wave form group also has the input voltage wave 26 and an output voltage wave 28 which has a total voltage value substantially equal to the value between the end 16a and end 16d and thus is higher in value than the input voltage. According to the present invention, the increased voltage circuit is rendered conductive and nonconductive at a frequency determined by the oscillator circuit 23 and is preferably many times the input voltage frequency. For example, if 60 cycle is the input voltage frequency, then one frequency which the oscillator circuit may have is 2000 cycles. Thus based on the frequency of the oscillator circuit the output voltage wave 28 caused by conduction of the increased voltage circuit has portions 28a which are produced when the circuit is conductive and a nonconductive portion 28b that occurs whenever the circuit is nonconductive. It will be appreciated that in the wave form 28 that the nonconductive portion 28b is substantially zero while the portion 28a extends for substantially the full duration of the frequency of the oscillator circuit. Thus the resultant output wave is essentially the value of voltage that appears between the ends 16a and 16d.

Wave group C exists when it is desired to have an output voltage that is the resultant of the increased voltage circuit being conductive for a total of one half of each half wave of input voltage and the decreased voltage circuit for the other total one half of each half wave. If the increased voltage circuit increased the output voltage to a value which is numerically the same as the decreased voltage circuit decreases the input voltage, then such a condition results in the resultant output voltage being substantially equal to the input voltage. Thus for this condition shown in wave group C, the increased voltage circuit is rendered conductive for one half the total duration of each half cycle of input voltage and the decreased voltage circuit is rendered conductive for the other half. The resultant is the output wave 29 whose resultant 30 is substantially the same as the input wave 26.

When the output voltage wave has a value tending towards the increased voltage circuit output voltage value, wave group D exists where the increased voltage circuit conducts more than the decreasing voltage circuit. Thus in wave group D there is shown the input wave 26 and an output wave 31 having portions 31a indicative of conduction through the increased voltage circuit and wave portions 31b indicative of conduction through the decreased voltage circuit with the resultant of the wave 31 being shown as dotted line wave 32, a wave that has a higher value than the input voltage wave but not as high as the output voltage wave 28 that exists for full conduction of increased voltage circuit.

Wave group E discloses input voltage wave 26 and an output wave 33 having increased voltage circuit conducting portions 33a and decreased voltage circuit conducting portions 33b with the resulting wave being indicated by the dotted line 34 which is lower in value than the input voltage wave 26. It will be appreciated comparing wave groups D and E that the ratio of conduction between the portions 31a and 31b and 33a and 33b for each half cycle of the oscillator circuit frequency determines the value of the resulting wave form indicated by the wave 32 or 34.

It will thus be seen that the present invention provides for varying the duration of conduction of the increased voltage circuit and the decreased voltage circuit for each half cycle of input voltage. The duration of conduction of each voltage circuit for each half cycle of input voltage is the sum of intervals of conduction that occur at a frequency that is much higher than the input voltage frequency so that the resultant wave of the conduction of the two circuits has a voltage value which is desired.

It will be appreciated that a filter circuit may be connected across the terminals 14 and 15 to substantially suppress the distortion introduced by the shifting of the output voltage between the increased voltage circuit and the decreased voltage value. As the distortion produced is essentially at the oscillator circuit frequency and its harmonics, which is preferably many times the frequency of the input voltage, i.e. 2000 to 60 c.p.s., the components of the filtering circuit may be easily selected to filter the output voltage distortion caused by the 2000 c.p.s. with minimal effect if any on the 60 c.p.s. output voltage frequency. For the specific 2000 c.p.s. frequency, a filter circuit consisting of an inductance 35 (10 mh.) and a capacitor 36 (4 mfd.) connected in the manner shown has been found satisfactory. Moreover, by the oscillator circuit frequency being so much more than the input voltage frequency, it will be appreciated that the input voltage frequency may be over a wide range without altering the effectiveness of the filtering circuit.

While the present invention has disclosed a power circuit that is capable of automatically regulating an A.C. input voltage to maintain an A.C. output voltage substantially constant, it will be understood that the power circuit may also control direct current. Moreover, the value of the output voltage which is desired to be maintained constant may be adjusted by appropriate adjustments in the output voltage sensing circuit as set forth in my above-mentioned copending application.

It will accordingly be appreciated that there has been disclosed a power circuit which may be employed in an automatic voltage regulator to regulate and maintain substantially constant an output voltage. The power circuit includes an increased voltage circuit and a decreased voltage circuit for providing, when one or the other is conducting, an increased voltage or a decreased voltage. According to the present invention, the shifting of conduction from one circuit to the other is made at a frequency which is substantially different than and preferably much higher than the frequency of the input voltage when the regulator is regulating A.C. voltage. The effect of shifting on the output voltage is thus made to be in a frequency range which is substantially removed from the frequency range of the A.C. input voltage and thus readily and easily filtered with minimal effect on the input voltage frequency, thereby substantially eliminating distortion caused by the power circuit in the output voltage.

Variations and modifications may be made within the

I claim:

1. A power circuit for providing an adjustable A.C. voltage comprising input terminals connectible to a source of A.C. voltage having a determined frequency; output terminals; a decreased voltage circuit coupled between the input and output terminals, and normally being nonconductive therebetween but upon energization being rendered conductive to provide a first voltage at the output terminals; an increased voltage circuit coupled between the input and output terminals and normally being nonconductive therebetween but upon energization being rendered conductive to provide a higher voltage at the output terminals than the first voltage; means interconnecting the decreased and increased voltage circuits for rendering one nonconductive upon conduction of the other; and means for energizing and deenergizing one of the voltage circuits to be conductive and nonconductive at a frequency more than twice the A.C. voltage frequency.

2. A power circuit for providing an adjustable A.C. voltage comprising input terminals connectible to a source of A.C. voltage having a determined frequency; output terminals; a decreased voltage circuit coupled between the input and output terminals, and normally being nonconductive therebetween but upon energization being rendered conductive to provide a first voltage at the output terminals; an increased voltage circuit connected between the input and output terminals, and normally being nonconductive therebetween but upon energization being rendered conductive to provide a higher voltage at the output terminals than the first voltage; means interconnecting the decreased and increased voltage circuits for rendering one nonconductive upon conduction of the other; means for energizing and deenergizing one of the voltage circuits to be conductive and nonconductive at a frequency more than twice the A.C. voltage frequency; and means for adjusting the ratio of conduction interval to nonconduction interval of the one circuit to thereby provide an output voltage of the A.C. voltage frequency which is the resulting sum of the conduction of the increased and decreased voltage circuits.

3. A power circuit for providing an adjustable A.C. voltage comprising input terminals connectible to a source of A.C. voltage having a determined frequency; output terminals; a decreased voltage circuit coupled between the input and output terminals, and normally being nonconductive therebetween but upon energization being rendered conductive to provide a first voltage at the output terminals; an increased voltage circuit coupled between the input and output terminals and normally being nonconductive therebetween but upon energization being rendered conductive to provide a higher voltage at the output terminals than the first voltage; means for energizing the decreased voltage circuit at substantially the beginning of each half cycle of A.C. voltage; means interconnecting the decreased and increased voltage circuits for rendering the decreased voltage circuit nonconductive upon conduction of the increased voltage circuit and conductive upon nonconduction of the increased voltage circuit; and means for energizing and deenergizing the increased voltage circuit to be conductive and nonconductive at a frequency more than twice the A.C. voltage frequency.

4. A power circuit for providing an A.C. voltage comprising input terminals connectible to a source of A.C. voltage having a determined frequency; output terminals; a decreased voltage circuit coupled between the input and output terminals, and normally being nonconductive therebetween but upon energization being rendered conductive to provide a first voltage at the output terminals; an increased voltage circuit connected between the input and output terminals and normally being nonconductive therebetween but upon energization being rendered conductive to provide a higher voltage at the output terminals than the first voltage; means for energizing the decreased voltage circuit at substantially the beginning of each half cycle of A.C. voltage; means interconnecting the decreased and increased voltage circuits for rendering the decreased voltage circuit nonconductive upon conduction of the increased voltage circuit and conductive upon nonconduction of the increased voltage circuit; means for energizing and deenergizing the increased voltage circuit to be conductive and nonconductive at a frequency more than twice the A.C. voltage frequency; and means for controlling the ratio of conduction interval to nonconduction interval of the increased voltage circuit to thereby provide an output voltage of the A.C. voltage frequency which is the resulting sum of the conduction of the increased and decreased voltage circuits.

5. A power circuit for providing an A.C. voltage comprising input terminals connectible to a source of A.C. voltage having a determined frequency; output terminals; a decreased voltage circuit coupled between the input and output terminals, and normally being nonconductive therebetween but upon energization being rendered conductive to provide a first voltage at the output terminals and including a semiconductor element normally being nonconductive to current flow therethrough but being conductive to current flow in one direction when energized; an increased voltage circuit coupled between the input and output terminals and normally being nonconductive therebetween but upon energization being rendered conductive to provide a higher voltage at the output terminals than the first voltage and including a semiconductor element normally being nonconductive to current flow therethrough but being conductive to current flow in one direction when energized; means for energizing the decreased voltage circuit at substantially the beginning of each half cycle of A.C. voltage; means interconnecting the decreased and increased voltage circuits for rendering the decreased voltage circuit nonconductive upon conduction of the increased voltage circuit and conductive upon nonconduction of the increased voltage circuit; means for energizing and deenergizing the increased voltage circuit to be conductive and nonconductive at a frequency more than twice the A.C. voltage frequency; and means for controlling the ratio of conduction interval to nonconduction interval of the increased voltage circuit to thereby provide an output voltage of the A.C. voltage frequency which is the resulting sum of the conduction of the increased and decreased voltage circuits.

6. The invention as defined in claim 5 in which there are two semiconductor elements in the decreased voltage circuit connected oppositely in parallel and the means for energizing the elements energizes one element for alternate half cycles of the A.C. voltage and the other element for the other alternate half cycles of the A.C. voltage.

7. The invention as defined in claim 5 in which there are one-way valve means in the increased voltage circuit connected to conduct current flow in only the one direction through the element for both half cycles of A.C. voltage.

8. The invention as defined in claim 5 in which there is a transformer connected to the input terminals and having at least two taps, means connecting one input terminal to one output terminal, and means connecting the decreased voltage circuit to one tap and another output terminal and means connecting the increased voltage circuit to another tap and the other output terminal.

9. The invention as defined in claim 5 in which there are filter means coupled to the output terminals having a band pass characteristic at the A.C. source frequency and band stop characteristics in the neighborhood of the energizing and deenergizing frequency.

(References on following page)

References Cited by the Examiner

UNITED STATES PATENTS

| | | | |
|---|---|---|---|
| 3,040,239 | 6/1962 | Walker | 323—24 |
| 3,075,136 | 1/1963 | Jones | 321—45 |
| 3,128,440 | 4/1964 | Davis | 323—60 |
| 3,156,860 | 11/1964 | Paynter | 321—18 |
| 3,160,808 | 12/1964 | Kruse | 323—22 |

OTHER REFERENCES

AIEE Conference Paper, W. F. Munzer, Characteristics and Applications for the 100 Ampere Trinistor Controlled Rectifier, Received May 1, 1962.

JOHN F. COUCH, *Primary Examiner.*

LLOYD McCOLLUM, *Examiner.*

D. L. RAE, K. D. MOORE, *Assistant Examiners.*